United States Patent
Bloomfield et al.

(10) Patent No.: US 8,572,354 B2
(45) Date of Patent: Oct. 29, 2013

(54) PROGRAMMABLE LOGIC UNIT AND METHOD FOR TRANSLATING AND PROCESSING INSTRUCTIONS USING INTERPRETATION REGISTERS

(75) Inventors: Jonathan Bloomfield, Surrey (GB); John Robson, Cambridge (GB); Nick Murphy, Surrey (GB)

(73) Assignee: 3DLabs Inc., Ltd., Hamilton (BM)

( * ) Notice: Subject to any disclaimer, the term of this patent is extended or adjusted under 35 U.S.C. 154(b) by 744 days.

(21) Appl. No.: 11/536,483

(22) Filed: Sep. 28, 2006

(65) Prior Publication Data

US 2008/0082799 A1    Apr. 3, 2008

(51) Int. Cl.
*G06F 9/30* (2006.01)

(52) U.S. Cl.
USPC ............................................. 712/208

(58) Field of Classification Search
USPC .................... 712/22, 24, 245, 208; 717/136
See application file for complete search history.

(56) References Cited

U.S. PATENT DOCUMENTS

| | | | |
|---|---|---|---|
| 5,794,063 A * | 8/1998 | Favor ............................. | 712/23 |
| 5,890,222 A | 3/1999 | Agarwal et al. | |
| 6,044,450 A * | 3/2000 | Tsushima et al. ............... | 712/24 |
| 6,263,429 B1 * | 7/2001 | Siska ............................ | 712/245 |
| 6,754,809 B1 | 6/2004 | Guttag et al. | |
| 6,779,101 B1 * | 8/2004 | Berg et al. ...................... | 712/24 |
| 6,874,078 B2 | 3/2005 | Pechanek et al. | |
| 7,181,730 B2 * | 2/2007 | Pitsianis et al. ............... | 717/132 |
| 2002/0199083 A1 | 12/2002 | Kao et al. | |

FOREIGN PATENT DOCUMENTS

EP     1278118 A2    1/2003

* cited by examiner

*Primary Examiner* — David J Huisman
(74) *Attorney, Agent, or Firm* — Creative Technology Ltd

(57) ABSTRACT

An architecture for microprocessors, in which instructions include a type identifier, selects one of several interpretation registers. The interpretation registers hold information for interpreting the opcode of each instruction, so that a stream of compressed instructions (with type identifiers) can be translated into a stream of expanded instructions. Preferably the type identifiers also distinguish sequencer instructions from processing-element instructions, and can even distinguish among different types of sequencer instructions (as well as among different types of processing-element instructions).

20 Claims, 3 Drawing Sheets

PROGRAMMABLE LOGIC UNIT AND METHOD FOR TRANSLATING AND PROCESSING INSTRUCTIONS USING INTERPRETATION REGISTERS

BACKGROUND AND SUMMARY OF THE INVENTION

The present application relates to instruction processing in microprocessor architectures, and more particularly to multimedia processing using parallel-processing architectures.

Any microprocessor (or analogous programmable logic) has to translate a stream of instructions into electrical operations in hardware: at the lowest level, the logical bits of the instruction must be translated into appropriate electrical signals sent to physical devices (e.g. transistors, gates, latches, or registers). One common way to implement this is with microcoded instructions, where a large number of bits specify signals to be applied to various lines, within a known hardware structure. Such instructions are necessarily bulky, because nearly all possible outputs are specified in each instruction. Moreover, such instructions become even more cumbersome in multiprocessor implementations.

Various attempts have been made to reduce the bulk of microcoded programs. One way which has been suggested to reduce the bulk of microcode is known as "vertical" microcode. This approach uses a decoding table to reduce the storage requirements. With this decoding table defined, each microcode instruction itself. (For example, if there are not more than 256 instructions, each can be referred to by an 8-bit name, even if the separate instructions are hundreds of bits in length.) The short "names" of instructions are referred to as vertical microcode, and the actual executable microcode instructions are referred to as "horizontal" microcode. In this approach, the lookup table is sometimes used to encode instruction fields rather than complete instructions. This reduces the memory space needed for the lookup. Additional logic is needed for appropriate field combination. The vertical microcode approach has been generally abandoned, because it is too slow.

A processor will usually have only a limited amount of writable control storage ("WCS") available. When there are too many routines to fit in WCS at once, some form of overlaying is necessary. A serial loop can be used to load microcode at startup, but using a serial loop to load overlays is not practical, since the host can load instructions only slowly (e.g. 100 microsecond—3 ms per instruction, depending on disk accesses). Some array processors provide microcode overlaying facilities, but these are normally host driven (using polled I/O or DMA), and are implemented via the normal microcode load mechanism.

One way to cope with parallel-processing hardware is to use instruction-level parallelism. A notable example of this is Very Long Instruction Word ("VLIW") architectures. In such architectures a single instruction can contain separate fields for separate paralleled portions of hardware, e.g. for separate paralleled ALUs, or even for alternative logical conditions. Processing Architectures With Types Instruction Sets The present application describes a new architecture, for microprocessors and the like, in which a new layer of indirection is added: the instruction sequence includes type identifiers which define how the individual instructions are to be translated. (Preferably but not necessarily, the type identifier points into a set of interpretation registers, and the selected register includes insertions which are combined with the opcode of the original instruction to produce an expanded executable instruction.)

This architecture overcomes many of the disadvantages of traditional Very Long Instruction Word (VLIW) architectures and, in various embodiments, provides one or more of at least the following advantages:
  The instruction set can be expanded while maintaining backward compatibility with existing programs;
  Program code density is much higher than with traditional VLIW instruction sets; and
  Algorithms can be coded independently of the type of data to be processed.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

The typed instruction set is a novel instruction format and decoding scheme that overcomes many of the disadvantages of traditional Very Long Instruction word (VLIW) architectures and has at least the following benefits:
  The instruction set can be expanded while maintaining backward compatibility with existing programs;
  Program code density is much higher than with traditional VLIW instruction sets; and
  Algorithms can be coded independently of the type of data to be processed.

Figure 1:
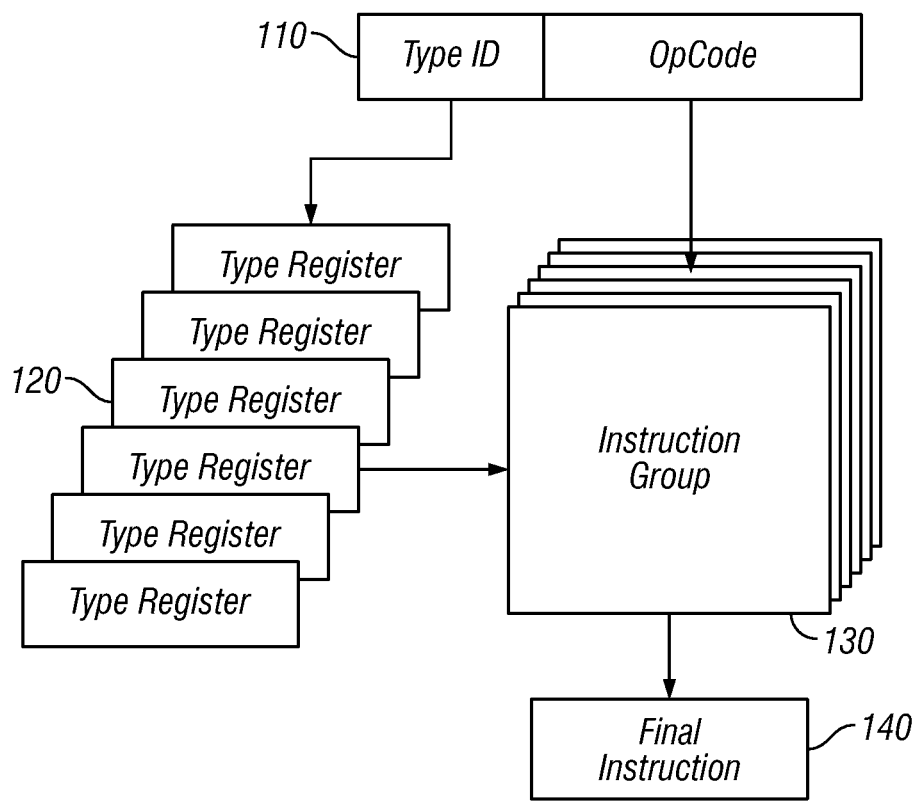
FIG. 1 schematically shows how an instruction is decoded using on-the-fly selection of the appropriate interpretation register (Type Register in this example) to get the appropriate Instruction Group.

FIG. 1 schematically shows how an instruction is decoded using on-the-fly selection of the appropriate interpretation register (Type Register in this example) to get the appropriate Instruction Group. With reference to FIG. 1, each instruction includes a Type ID field (110) that is used to select one of an array of Type Registers (120). Each Type Register selects an Instruction Group to use (130) and the Opcode field of the instruction selects an Instruction from the Instruction Group to determine the Final Instruction (140) to be presented to the microprocessor.

In this sample embodiment, every instruction has a fixed size of 32 bits. Each instruction contains a 3-bit Type ID, a 4-bit Opcode field, one bit to indicate a conditional instruction and 24 bits to specify the operands. Instructions can be sequencer or PE (processing element) instructions. In this embodiment the sequencer instructions (sequencer commands) direct a single sequencer; this helps to amortize the hardware needed to control the processing elements. The PE instructions have another level of indirection.

In this sample embodiment, the Type ID is composed of 3 bits. Two of the eight possible Type ID values are reserved to indicate a Sequencer instruction, leaving size values to indicate a Processing Element (PE) instruction and select one of the six Type Registers.

In this sample embodiment, each Type Register is 64 bits wide, and contains a 6-bit field to select one of 64 possible Instruction Groups, each of which can contain up to 16 instructions. The remaining 58 bits of each Type Register specify operand control information including but not limited to the vector length, the stride between vector elements, whether each operand should be transposed when reading and writing the PE Register File, and how various flag and mask registers within the PEs are used to control each element of the vector operation.

In this sample embodiment, the opcode is 4 bits. It is used to determine an instruction out of the 16 instructions contains in an instruction group. Typically the same arithmetic or logical operations (for example, Add or bit wise-XOR) will be defined in the same Opcode positions within several different Instruction Groups, but each of these Instruction Groups will be defined to operate on a different operand data format (for example, 32-bit floating point or 32-bit integer). When more than 16 arithmetic or logical operators are required for the same operand data format, then more than one Instruction Group may be defined for that data format. The 24-bit operand select field will typically contain absolute or relative addresses for program execution control flow instructions.

Very generally speaking, the Sequencer instructions can be divided into five groups:
1) Program execution flow control (e.g. AbsJmp, RelJmp, AbsJsr, RelJsr, RetJmp, LnkJmp, GlcJmp, ElsJmp, OffJmp, Resume)
2) Sequencer mode register updates (e.g., SetMde, AddMde, MovMde, LdNxtU, SetFlg, UseNxt, SetBuf, SetOff, SetBMS, SetMsk)
3) PE Register file updates (e.g. LdImmd, Seq2Pe, GetMem, PutMem, GetInd, PutInd, RdFifo, WrFifo, GetSte, PutSte, GetVal, PutVal)
4) Instruction cache control (e.g. PFetch), and
5) Synchronization (e.g. ChkPnt)

The sequencer mode register updates (register configuration commands) (group 2 above) are particularly relevant to the Data Type Registers, which are for example loaded using SetMde.

One of the benefits of this architecture is an Expandable Instruction Set. Only nine of the possible 64 Instruction Groups are defined for the S2 implementation of the DES architecture, leaving 55 available for future expansion. New Instruction Groups can be added without any conflicts with the existing instruction set, allowing existing software to run unchanged on future generations of the hardware.

Another benefit is VLIW Code Compression. Sequencer instructions are used to load the Type Registers with type information that affects subsequent PE instructions. Traditional VLIW architectures must include such information within each and every instruction, but the S2 Type Registers act as a cache and take advantage of the locality of PE instruction types to reduce the frequency with which this information needs to be updated. The S2 assembler and compiler can automatically analyze program code and minimize the number of instructions emitted to perform Type Register updates. Each S2 instruction is 32 bits wide, but to provide a VLIW representation of the same instruction set would require approximately 96 bits per instruction and thus require considerably more program storage space.

Another benefit is Data Type Abstraction. Algorithms can be coded independently of the type of data to be processed. For example, exactly the same sequence of instructions could be run to process either 32-bit floating point or 32-bit integer data, simply by changing the Instruction Group specified within the appropriate Type Register.

Figure 2:
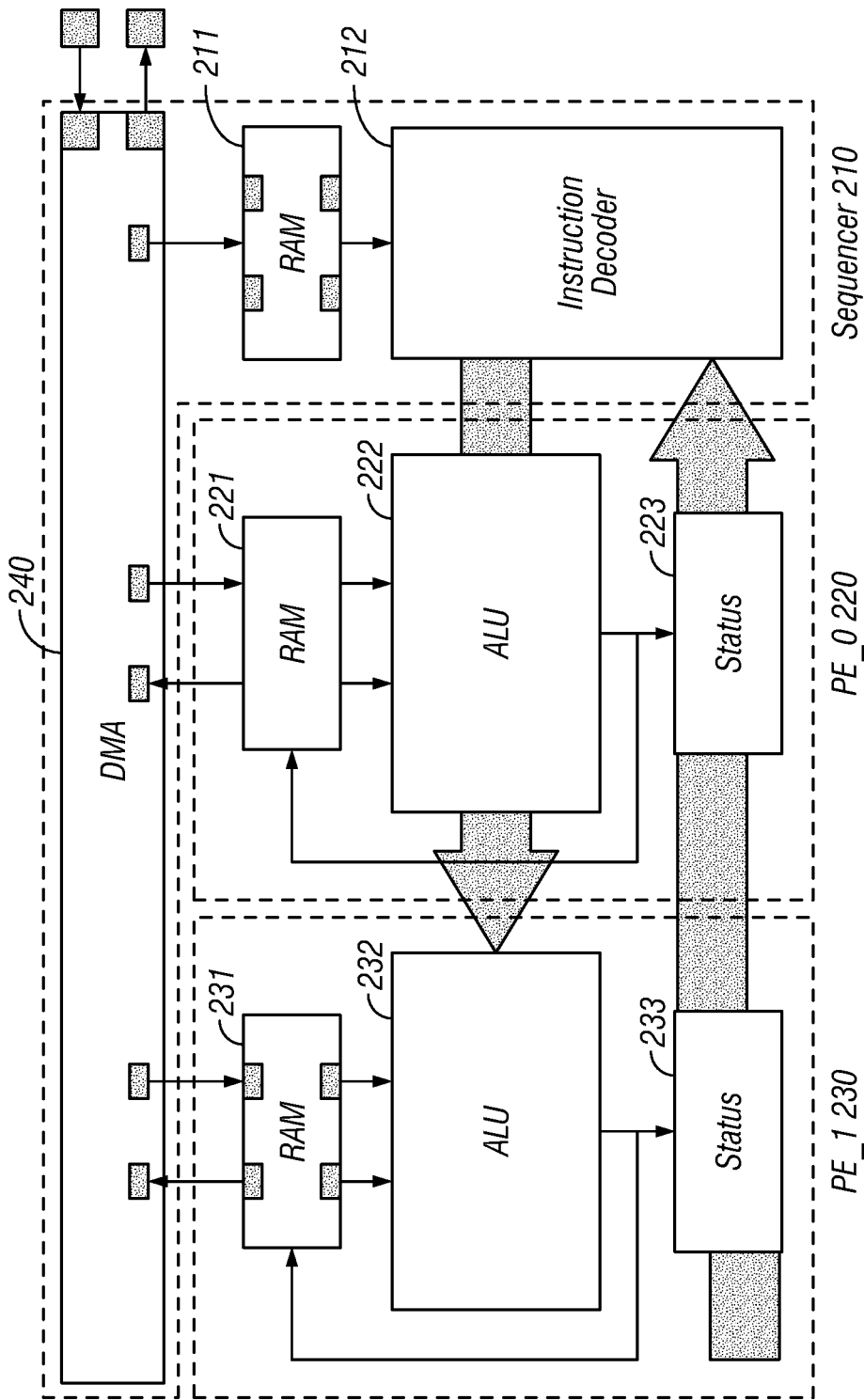
FIG. 2 shows one example of a processor architecture in which the disclosed inventions can be advantageously embodied. (As discussed below, the disclosed inventions can be embodied in many other architectures as well.)

FIG. 2 shows one example of a processor architecture in which the disclosed inventions can be advantageously embodied. (As discussed below, the disclosed inventions can be embodied in many other architectures as well.) Although this description includes information about the sizes of instructions and register bit fields for the S2 implementation of the DES architecture, these dimensions are intended to be illustrative only.

S2 is a SIMD (single instruction multiple data) processor array that has a number of processing elements (for example 8) that all apply the same operations to different data held in different register files. FIG. 2 illustrates two of such processing elements (220 & 230). S2 is a SIMD processor array that includes a DMA (Direct Memory Access) 240, a processing element 220, and processing element 230. A processing element 220 contains an ALU 222, a RAM 221, and a status 223. A processing element 230 contains an ALU 232, a RAM 231, and a status 233. A single sequencer 210 is used to amortize the hardware needed to control the processing elements. RAMs 221 and 231 in each processing element store register files. The RAM 211 in Sequencer 210 stores instructions. The Sequencer 210 also includes an instruction decoder 212 that interprets and implements the instructions.

Figure 3:
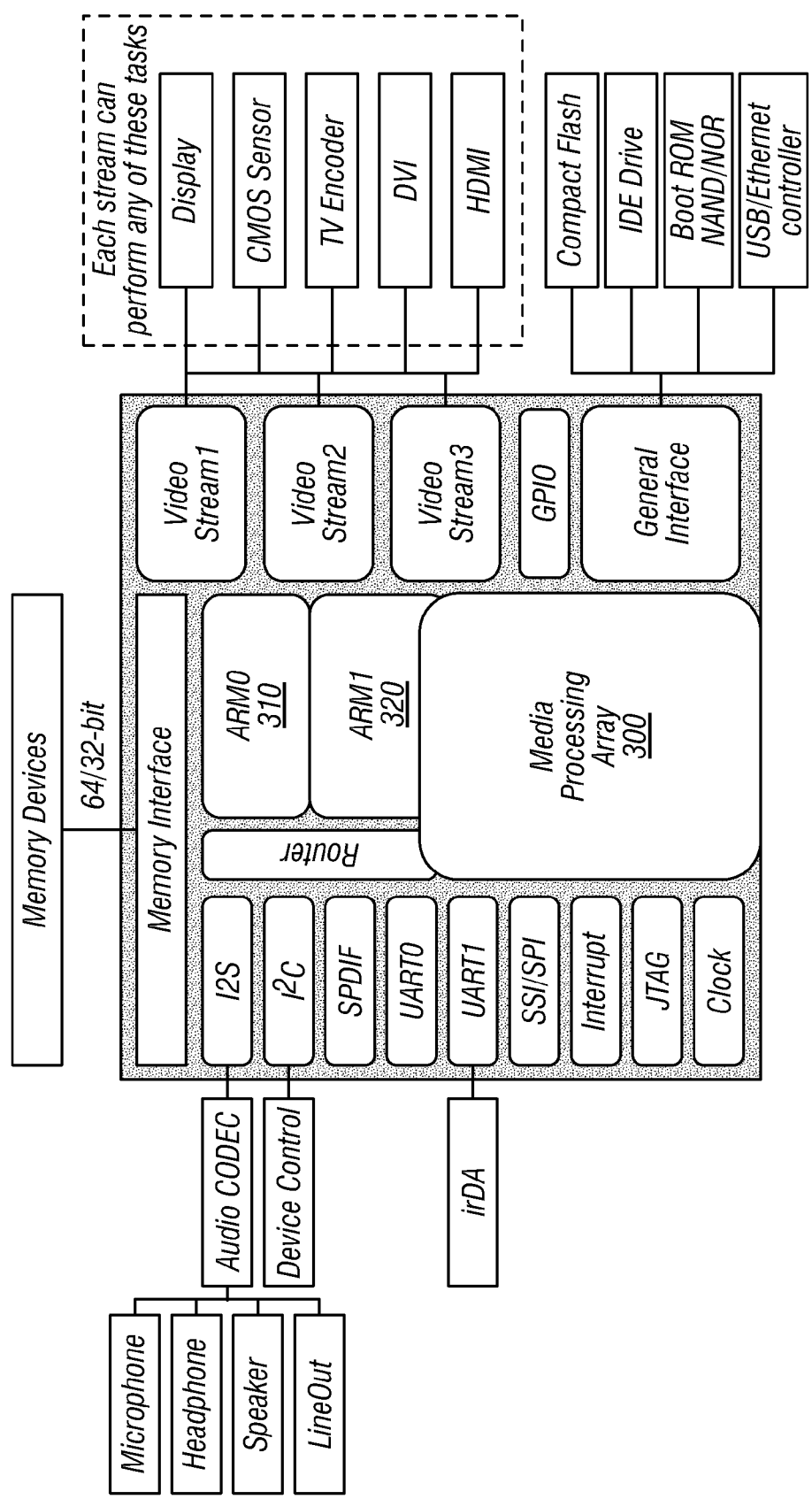
FIG. 3 shows an example of a processing cluster is which the disclosed inventions can be advantageously embodied. (As discussed below, the disclosed inventions can be embodied in many other architectures as well.)

FIG. 3 shows an example of a processing cluster in which the disclosed inventions can be advantageously embodied. (As discussed below, the disclosed inventions can be embodied in many other architectures as well.)

Media Processing Array (300) is a plurality of such clusters that can support various media processing including video, audio, 2D graphics and 3D graphics. ARM0 (310) is the control processor running operating system. ARM1 (320) is asynchronous co-processor running the single user-level process. ARM1 (320) runs the program and issues instructions to Media Processing Array (300). ARM1 (320) can also classify data stream into various blocks before feeds the data stream into various clusters in Media Processing Array (300).

According to various disclosed embodiments, there is provided: A programmable logic unit, comprising: one or more programmable processing elements; and a sequencer which is connected to decode instructions in an instruction stream using indirect reference to multiple interpretation registers, as specified by a Type ID value within said instructions, and to send commands to said processing elements accordingly.

According to various disclosed embodiments, there is provided: A method of executing a series of processing instructions, comprising the actions of: a) interpreting each of the instructions with reference to a respective interpretation register which is specified in a Type ID field of one of said instructions; and b) executing said instructions in accordance with said step (a).

According to various disclosed embodiments, there is provided: A method for executing a series of processing instructions, comprising the actions of: a) interpreting each of the instruction using an indirect reference to a respective interpretation register which is specified in a Type ID field of ones of said instructions; wherein said Type ID field distinguishes between sequencer and processing-element instructions, and also distinguishes among multiple different formats for processing-element instructions; and b) executing said instructions in accordance with said step (a).

According to various disclosed embodiments, there is provided: A computing architecture comprising: processing instructions in an instruction stream, each including both command bits and also a Type ID which selects among multiple interpretation registers; some of said interpretation registers containing information for interpreting said commands differently, depending on which of said interpretation registers has been selected; and sequencing logic which is connected to expand said commands, in combination with information stored in said interpretation registers, to thereby generate an expanded instruction which is sent to one or more processing elements.

According to various disclosed embodiments, there is provided: A computing architecture in which: processing instructions are mixed with sequencing instructions in a stream; and at least one sequencer is connected to receive the processing instructions, and to expand at least some of the processing instructions by use of an interpretation register to produce executable commands for one or more processing elements; and said sequencer is also connected to receive the sequencing instructions, and can change the values in said interpretation register in response to at least one said sequencing instruction.

According to various disclosed embodiments, there is provided: A multiprocessing system, comprising multiple interconnected units as described above.

According to various disclosed embodiments, there is provided: An architecture for microprocessors and the like in which instructions include a type identifier, which selects one of several interpretation registers. The interpretation registers hold information for interpreting the opcode of each instruction, so that a stream of compressed instructions (with type identifiers) can be translated into a stream of expanded instructions. Preferably the type identifiers also distinguish sequencer instructions from processing-element instructions, and can even distinguish among different types of sequencer instructions (as well as among different types of processing-element instructions).

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

For example, although the preferred embodiment is a SIMD architecture (at the lowest level), the innovative ideas can also be implemented with more instruction-level parallelism, e.g. in MIMD architectures. A simple example of this would be simply concatenating the instructions for separate single-instruction streams, e.g. concatenating three 32-bit single-instruction streams to make one 96-bit stream which is broadcast to three (or more) SIMD machines, but of course many other instances of MIMD implementations are possible. It should also be noted that the preferred embodiment described above is both SIMD and MIMD, i.e. it is SIMD at the lowest level but MIMD at a higher level.

For another example, the disclosed inventions can of course be applied to other SIMD architectures, and other SIMD-MIMD hybrid architectures, as well.

It should also be noted that the disclosed inventions are not only applicable to parallel-processing architectures, but can be applied to an enormous variety of microprocessor-type architectures (including e.g. general-purpose microprocessors, digital signal processors, mixed signal processors, other special purpose microprocessors, microcomputers, microcontrollers, microprocessor cores embedded within integrated systems, programmable integrated-power devices, and other programmable integrated-circuit devices generally). However, the disclosed inventions are particularly advantageous in a parallel-processing media chip, as described above.

For another example, the format of the Type ID field in the preferred embodiment is quite arbitrary, and more or fewer bits can optionally be used.

For another example, other nomenclature can be used for the "Type ID field" referred to in the preferred embodiment. Other functions can be added into this field (or other bits combined with it).

For another example, larger or multiple Type ID fields can be used to key into multiple interpretation registers. In such embodiments two (or more) independent Type ID specifiers can be used independently, to specify the interpretation of two (or more) segments of the command field(s).

For another example, it also possible to provide a sequencer option to modify or ignore the Type ID of following instructions with a few registered bits. This can be useful, for example, when an algorithm is being rerun for a different data type.

For another example, the definition of the Type ID fields can be varied systematically though the instruction sequence. A simple example of this is to issue the Type ID only across sequences of two (or four) successive instructions. However, this is less preferred.

The multiple interpretation registers can be used by programmers in many ways. For one example, the interpretation registers can be used to change between different data resolutions as well as different data types. For another example, the registers can be used to handle inputs from (and/or outputs to) differently-formatted data sources, without any need for a separate conversion step. For another example, this capability can be used for easy handling of different data formats, e.g. big-endian and little-endian.

Additional general background, which helps to show variations and implementations, may be found in the following publications: Jerraya and Wolf, Multiprocessor Systems-on-Chips (2004); A. Tanenbaum, Structured Computer Organization (5. ed. 2005); and Hennessy and Patterson, Computer Architecture (3. ed. 2002); all of which are hereby incorporated by reference in their entirety.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A programmable logic unit, comprising:
one or more programmable processing elements; and
a sequencer which decodes instructions in an instruction stream using indirect reference to multiple interpretation registers, as specified by a Type Identifier (ID) value and an opcode value within said instructions, and sends commands derived from the instruction stream to said one or more processing elements;
wherein said interpretation registers include identifiers defining respective mappings of opcodes to one of a plurality of instruction groups, and said commands being at least partly determined by said mappings; and wherein said interpretation registers include operand control information that comprises a vector length and a stride between vector elements.

2. The unit of claim 1, wherein said instruction stream includes both processing instructions and sequencing instructions.

3. The unit of claim 1, wherein said instruction stream includes both processing instructions and sequencing instructions, and wherein both said processing instructions and said sequencing instructions include said Type ID value, and wherein said Type ID value also indicates whether each instruction is a processing instruction or a sequencing instruction.

4. The unit of claim 1, wherein said instruction stream includes both processing instructions and sequencing instructions, and said sequencing instructions include commands for changing the values in at least some ones of said interpretation registers.

5. The unit of claim 1,
wherein said commands are expanded by at least one sequencer; and
wherein said instruction stream includes both processing instructions and sequencing instructions; and
wherein said sequencing instructions include set-up commands which are executed by the at least one sequencer and not by said one or more processing elements, said set-up commands including commands for changing the values in an interpretation register.

6. The unit of claim 1, wherein said commands are expanded by at least one sequencer; and wherein the at least one sequencer broadcasts a single instruction stream to multiple processing elements in a single instruction, multiple data (SIMD) configuration.

7. The unit of claim 1, wherein each single one of said instructions specifies only a single opcode.

8. The unit of claim 1, wherein each of said instructions of said instruction stream includes an index number which selects a respective portion of said interpretation registers, and wherein said sequencer expands said instructions by using said respective portion of said interpretation registers.

9. A method of executing a series of instructions, comprising the steps of:
a) interpreting each of the instructions with reference to a respective one of multiple interpretation registers specified in a Type Identifier (ID) field of said instructions, the interpretation registers including identifiers that define respective mappings of opcodes to instruction groups and operand control information including vector length and stride between vector elements, wherein commands associated with the opcodes are at least partly determined by said mappings, and wherein said operand control information comprises control of an operand data type; and
b) executing said instructions.

10. The method of claim 9, wherein said series of instructions includes both processing instructions and sequencing instructions.

11. The method of claim 9, wherein said series of instructions includes both processing instructions and sequencing instructions, and wherein said Type ID field also indicates whether each instruction is a processing instruction or a sequencing instruction.

12. The method of claim 9, wherein said series of instructions includes both processing instructions and sequencing instructions, and said sequencing instructions include commands for changing the values in at least one interpretation register.

13. The method of claim 9, wherein at least one instruction of said series of instructions is expanded by at least one sequencer;
wherein said series of instructions includes both processing instructions and sequencing instructions; and
wherein said sequencing instructions include set-up commands which are executed by a sequencer and not by processing elements, said set-up commands including commands for changing the bit values in the interpretation registers.

14. The method of claim 9, wherein said instructions are expanded by at least one sequencer; and
wherein said at least one sequencer broadcasts a single instruction stream to multiple processing elements in a single instruction, multiple data (SIMD) configuration.

15. The method of claim 9, wherein each single processing instruction specifies only a single opcode.

16. The method of claim 9, wherein each of said instructions includes an index number which selects a respective particular portion of a respective interpretation register, and wherein a sequencer expands said instructions by using said respective particular portion of said respective interpretation register.

17. A method for executing a series of instructions, comprising the steps of:
a) interpreting each of the instructions using an indirect reference to a respective one of multiple interpretation registers which is specified in a Type Identifier (ID) field of said instructions, the interpretation registers including operand control information including vector length and stride between vector elements; wherein said Type ID field distinguishes between sequencer instructions and processing-element instructions, and also distinguishes among multiple different formats for processing-element instructions; wherein the respective interpretation register includes an identifier that selects respective mappings of opcodes to instruction groups, and commands associated with the opcodes are at least partly determined by said mappings, and
b) executing said instructions.

18. The method of claim 17, further comprising:
changing the values in at least some ones of said interpretation registers in response to commands included within sequencer instructions.

19. The method of claim 17, further comprising:
expanding said instructions using at least one sequencer; and
wherein said sequencer instructions include set-up commands which are executed only by a sequencer.

20. The method of claim 17, wherein said sequencer instructions include commands for changing the bit values in the respective interpretation register.

* * * * *